US009482156B2

(12) United States Patent
Nordstrom et al.

(10) Patent No.: US 9,482,156 B2
(45) Date of Patent: Nov. 1, 2016

(54) VEHICLE RECUPERATOR

(71) Applicants: Rolls-Royce North American Technologies, Inc., Indianapolis, IN (US); Rolls-Royce Corporation, Indianapolis, IN (US)

(72) Inventors: Carl D. Nordstrom, Sao Paulo (BR); Rigoberto J. Rodriguez, Avon, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 358 days.

(21) Appl. No.: 14/141,904

(22) Filed: Dec. 27, 2013

(65) Prior Publication Data

US 2015/0014994 A1   Jan. 15, 2015

Related U.S. Application Data

(60) Provisional application No. 61/774,547, filed on Mar. 7, 2013.

(51) Int. Cl.
   *F02C 7/10* (2006.01)
   *F01D 15/10* (2006.01)
   *H02K 7/18* (2006.01)

(52) U.S. Cl.
   CPC .................. *F02C 7/10* (2013.01); *F01D 15/10* (2013.01); *H02K 7/1823* (2013.01); *F05D 2220/76* (2013.01); *F05D 2260/42* (2013.01);
   (Continued)

(58) Field of Classification Search
   CPC .............. F02C 7/36; F02C 1/04; F02C 3/10; F02C 6/08; F02C 7/08; F02C 7/32; F02C 9/26; F05D 2220/76; F05D 2220/323; F05D 2220/329; F05D 2270/023; F05D 2270/05; F05D 2270/101; F01D 15/10; F04D 27/0207
   USPC .................... 290/52, 40 C; 415/1, 178, 114; 60/39.182, 39.183, 39.21, 772; 224/134 D
   See application file for complete search history.

(56) References Cited

U.S. PATENT DOCUMENTS

| | | | |
|---|---|---|---|
| 3,166,902 A | * | 1/1965 | Meyer et al. .................... 60/792 |
| 4,347,711 A | * | 9/1982 | Noe et al. ........................ 62/160 |

(Continued)

FOREIGN PATENT DOCUMENTS

| | | | |
|---|---|---|---|
| GB | 578686 A | * | 7/1946 |
| GB | 578686 A | | 7/1946 |

(Continued)

OTHER PUBLICATIONS

International search report PCT/US2013/070480 mailed on Sep. 22, 2014.

*Primary Examiner* — Tulsidas C Patel
*Assistant Examiner* — Charles Reid, Jr.
(74) *Attorney, Agent, or Firm* — Fishman Stewart PLLC

(57) ABSTRACT

An engine may have a recuperator that may be powered by an electrical generator driven by the engine. The recuperator may be disposed within or incorporated into a compressor discharge of the engine, such as in the form of a vane or tube. The engine may be configured to operate in a variety of modes at least some of which may use thermal energy from the recuperator to heat a fluid flow stream of the engine. An energy storage device may be used with an electrical generator to provide power to a load.

16 Claims, 4 Drawing Sheets

(52) U.S. Cl.
CPC ..... *F05D2270/052* (2013.01); *F05D 2270/07* (2013.01); *F05D 2270/071* (2013.01)

(56) References Cited

U.S. PATENT DOCUMENTS

| | | | |
|---|---|---|---|
| 4,446,694 A | | 5/1984 | Walton |
| 5,241,814 A | * | 9/1993 | Butler ........................ 60/39.08 |
| 5,281,091 A | | 1/1994 | Dooley et al. |
| 5,932,940 A | * | 8/1999 | Epstein et al. ......... 310/40 MM |
| 7,285,871 B2 | | 10/2007 | Derouineau |
| 7,481,621 B2 | | 1/2009 | Campbell et al. |
| 7,513,120 B2 | | 4/2009 | Kupratis |
| 7,518,254 B2 | * | 4/2009 | Donnelly et al. ........... 290/40 C |
| 7,584,600 B2 | | 9/2009 | Klingels |
| 7,789,620 B2 | | 9/2010 | Vontell, Sr. et al. |
| 8,740,102 B2 | * | 6/2014 | Edwards ..................... 236/93 A |
| 8,957,539 B1 | * | 2/2015 | Ralston ........................... 290/52 |
| 2003/0049139 A1 | * | 3/2003 | Coney et al. ................. 417/243 |
| 2005/0056021 A1 | * | 3/2005 | Belokon et al. ............... 60/772 |
| 2005/0252696 A1 | * | 11/2005 | Kaufman ...................... 180/2.2 |
| 2007/0137216 A1 | * | 6/2007 | Joshi et al. .................... 60/791 |
| 2010/0284780 A1 | | 11/2010 | Wadia et al. |
| 2011/0271687 A1 | * | 11/2011 | Nordstrom et al. ............ 60/785 |
| 2014/0169956 A1 | * | 6/2014 | Lyders .......................... 415/200 |

FOREIGN PATENT DOCUMENTS

| | | | |
|---|---|---|---|
| GB | 827542 A | | 2/1960 |
| GB | 827542 A | * | 2/1960 |
| GB | 905664 A | | 9/1962 |
| GB | 905664 A | * | 9/1962 |

* cited by examiner

VEHICLE RECUPERATOR

CROSS-REFERENCE TO RELATED APPLICATIONS

This application claims priority to U.S. Provisional Patent Application No. 61/774,547, filed Mar. 7, 2013, the contents of which are hereby incorporated in their entirety.

TECHNICAL FIELD

The present disclosure generally relates to a system and method for heating a flow stream of an engine via a recuperator to reduce response times of the engine.

BACKGROUND

Gas turbine engines are often used in applications in which it is required to go from a low power setting to one of instant high power. However, certain engines may require several seconds to achieve this. Furthermore, altitude operation, such as in the case of aircraft, imposes even greater acceleration times. At or near idle speeds, engines may be near the compressor surge line, and as such need to be managed accordingly. This in turn affects the ability for the engine to have quick response. Therefore, there exists a need for a system and method to reduce response times for engine power delivery.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

It is often desired for an engine to quickly respond from a low power to a high power mode in which high power is required. To reduce response times, an exemplary engine may incorporate at least one recuperator, in addition to a compressor, a combustor, and a turbine. The compressor and the turbine may be coupled together, and may have a flow path there between by which a fluid flow stream may flow from the compressor to the turbine. The compressor may have a compressor discharge through which the fluid flow stream may exit the compressor. The turbine may be configured to receive the fluid air stream to generate power. The combustor may be located between the compressor and the turbine, and may be configured to provide heat to the fluid flow stream. The at least one recuperator may be disposed downstream of the compressor, and may be configured to transfer heat with the fluid flow stream en route to the combustor. An exemplary system incorporating the engine may also include an electric generator operatively coupled to the turbine to receive at least a portion of the power generated by the turbine. The electric generator may further be in communication with the at least one recuperator.

Another exemplary engine may also include a compressor, a combustor, and a turbine. The compressor may have a compressor discharge that includes an electrical heating element operable to transfer heat to the fluid flow stream.

An exemplary process may include first supplying fuel at a flow rate to an engine such that it operates in a high power mode. The engine generally may include a compressor, a combustor, a turbine, and a recuperator, as described above. The process may then include decreasing the fuel flow rate while supplying energy to the recuperator such that the engine continues to operate. The method may further include powering a load by reducing the energy supplied to the recuperator, and receiving power from an energy storage device.

Figure 1:
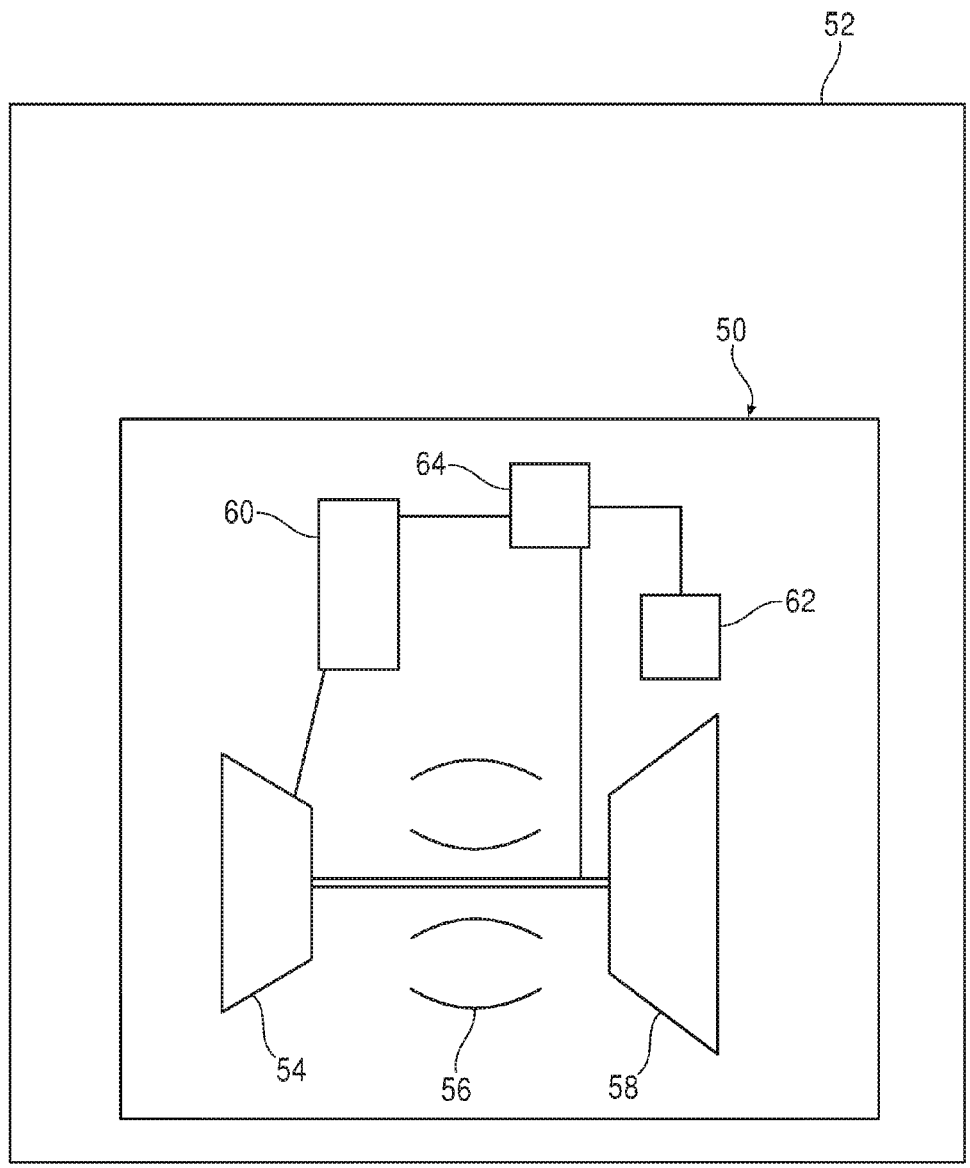
FIG. 1 is a schematic block diagram of an exemplary engine of an aircraft, where the engine includes a recuperator.

Referring now to the figures, FIG. 1 illustrates an exemplary engine 50 used as a power plant for an aircraft 52. As used herein, the term "aircraft" may include, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present disclosures are contemplated for utilization in other applications that may not be coupled with an aircraft such as, for example, industrial applications, land and/or marine applications, power generation, pumping sets, naval propulsion and other applications known to one of ordinary skill in the art.

The engine 50 may be a gas turbine engine, and may include a compressor 54, a combustor 56, and a turbine 58. In operation, the engine 50 may have a fluid flow stream in which a fluid, such as air, may flow from the compressor 54 to the turbine 58. Although the engine 50 is depicted as having a single spool, it should be appreciated that the engine 50 may have any number of spools. In addition, in some exemplary approaches, the engine 50 may be an adaptive cycle and/or a variable cycle engine, and may take on a variety of forms such as a turbofan engine, a turboprop engine, and a turboshaft engine. Furthermore, the engine 50 may be an axial flow, centrifugal flow, or a hybrid flow engine.

Figure 2:
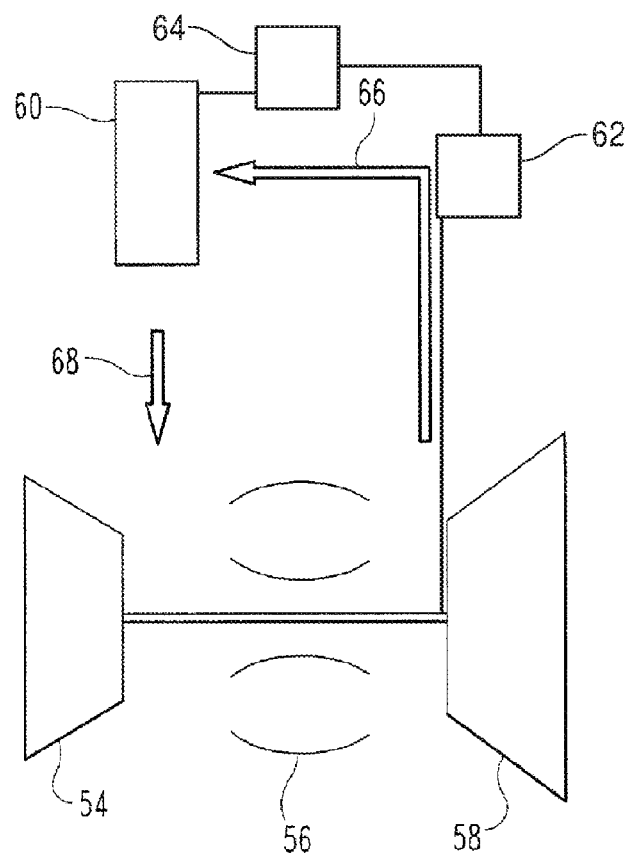
FIG. 2 is a schematic block and flow diagram of the engine of FIG. 1 according to one exemplary approach.

Referring now to FIG. 2 and with continuing reference to FIG. 1, the engine 50 also may include a recuperator 60 configured to receive energy from one location of the fluid flow stream (shown generally as arrow 66) and to deliver the energy in the form of thermal energy to another location of the fluid flow stream, e.g., between a portion of the compressor 54 and a portion of the turbine 58 (shown generally as arrow 68). To set forth an example, the recuperator 60 may be configured to provide heating to the engine 50 via energy extracted by operation of the turbine 58. It should be appreciated that the recuperator 60 may be configured to deliver the thermal energy to a location within the compressor 54, such as at an intermediate stage of compressor vanes (not shown), in addition to or in lieu of the fluid flow stream between the compressor 54 and the turbine 58.

Figure 4:
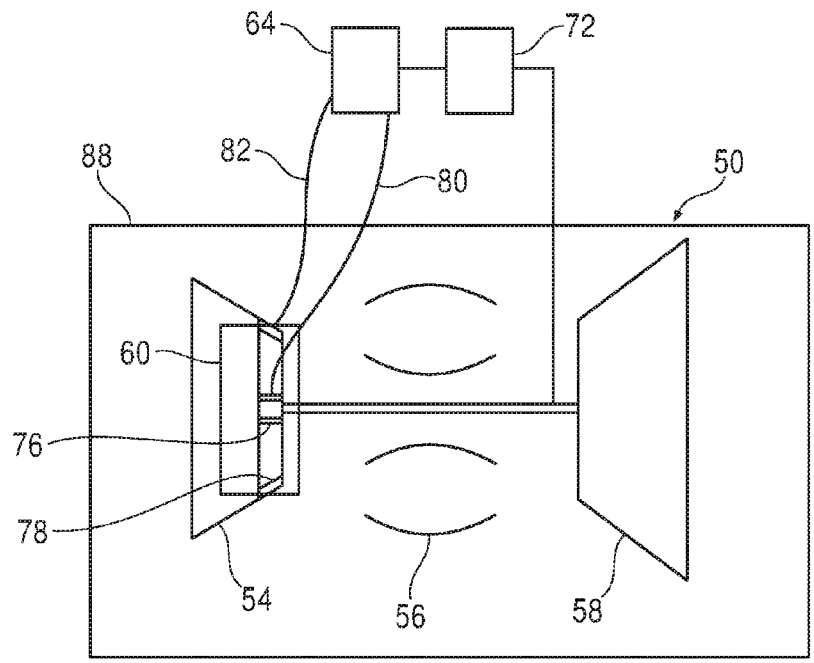
FIG. 4 is a schematic block diagram of the engine of FIG. 1 according to another exemplary approach.
Figure 6:
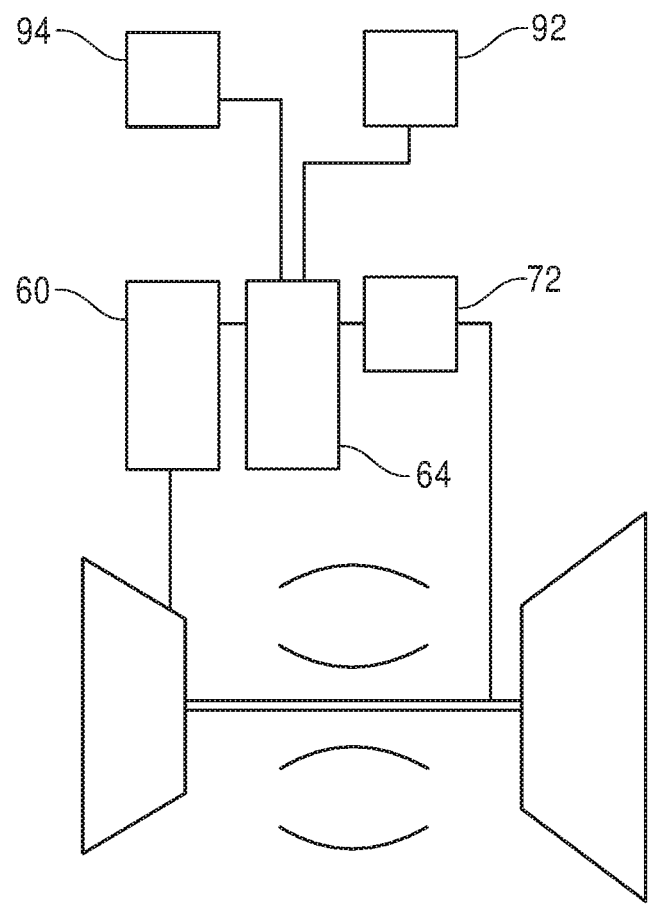
FIG. 6 is a schematic block diagram of the engine according to another exemplary approach.

While the recuperator 60 is shown displaced from an engine reference line apart from the compressor 54, the combustor 56, and the turbine 58, it should be appreciated that the recuperator 60 may be located in a variety of other locations. For example, as depicted in FIGS. 2, 4 and 6, the recuperator 60 may be located at or incorporated into the compressor discharge 70 through which the fluid flow stream may exit the compressor 54. This enables energy from the flow stream to be used to heat the recuperator 60 and provide thermal energy to that location.

Figure 3:
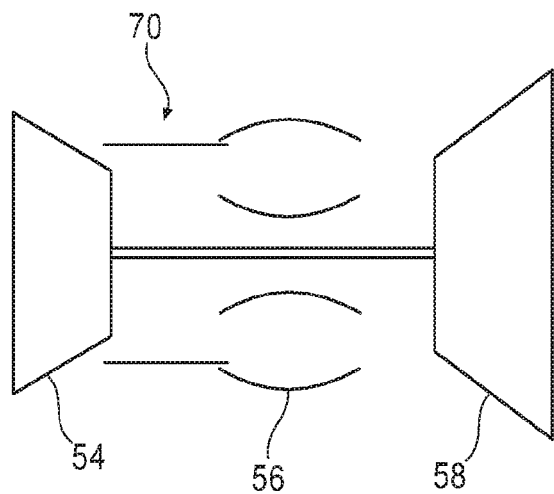
FIG. 3 is a schematic illustration of the recuperator of the engine of FIG. 2 according to one exemplary approach.
Figure 5:
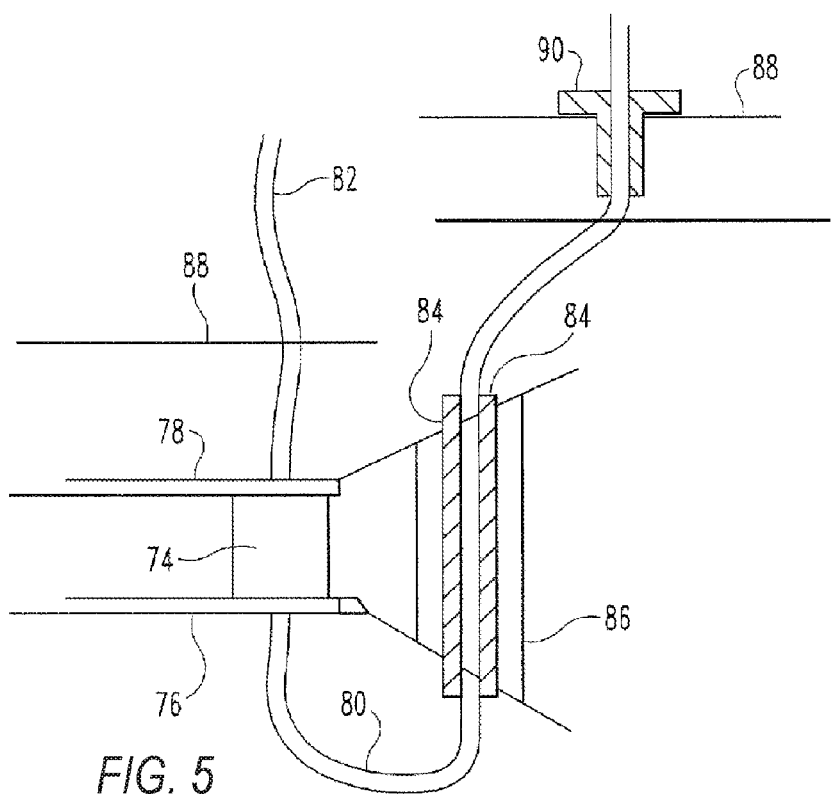
FIG. 5 is a schematic illustration of the recuperator of the engine of FIG. 4 according to another exemplary approach.

Referring now to FIG. 3, the recuperator 60 may be incorporated into the compressor discharge 70, as mentioned above. The compressor discharge 70 may be located downstream from the last rotating component of the compressor 54 (not shown). For example, the last rotating component may be the last bladed row in an axial flow compressor, but may also be the location downstream of a centrifugal compressor. The compressor discharge 70 may include any flow path structure disposed between the last rotating component of the compressor 54 and the combustor 56. For example, the compressor discharge 70 may extend from the last rotating component, e.g., the last row of compressor blades, to a relative open area that may include fuel nozzles and other components that generally may make up the combustor 56. In one form, the compressor discharge 70 may include a diffuser configured to reduce the velocity of the fluid flow stream exiting the compressor 54 and raise its static pressure. Additionally or alternatively, the compressor discharge 70 may include associated components such as struts and vanes, as depicted in FIG. 5 and described in more detail hereinafter. In one form, the compressor discharge 70 may take the form of a discharge tube of the compressor 54. Any portion of the compressor discharge 70 may be used as the recuperator 60 to add thermal energy to the fluid flow stream passing from the compressor 54 to the combustor 56.

Referring back to FIG. 1, the aircraft 52 may be capable of operating at a variety of speeds and accordingly may include a sensor 62 and a controller 64. The sensor 62 may be configured to measure various aircraft flight conditions including, but not limited to, speed and altitude, and to output any variety of data sensed and/or calculated. For example, the sensor 62 may sense and output conditions including, but not limited to, static temperature, static pressure, total temperature, and/or total pressure, Additionally or alternatively, the sensor 62 may calculate and output values including, but not limited to, equivalent airspeed, altitude, and Mach number. Any number of other sensed conditions and/or calculated values may also be output. The sensor 62 may transmit the data to the controller 64 in either analog or digital form. The controller 64 may further be configured to direct the recuperator 60 to deliver thermal energy to a specific location within the flow stream based upon at least one parameter and/or calculation.

The controller 64 may be configured to monitor and control engine operations. The controller 64 may include digital circuitry, analog circuitry, or a hybrid combination of both of these types. Also, the controller 64 may be programmable, an integrated state machine, or a hybrid combination thereof. The controller 64 may include one or more Arithmetic Logic Units (ALUs), Central Processing Units (CPUs), memories, limiters, conditioners, filters, format converters, or the like which are not shown to preserve clarity. In one form, the controller 64 may be of a programmable variety that executes algorithms and processes data in accordance with operating logic that is defined by programming instructions (such as software or firmware). Alternatively or additionally, operating logic for the controller 64 may be at least partially defined by hardwired logic or other hardware. In one particular form, the controller 64 may be configured to operate as a Full Authority Digital Engine Control (FADEC); however, in other approaches, the controller 64 may be organized and/or configured in any manner as would occur to those skilled in the art. It should be appreciated that controller 64 may be exclusively dedicated to the control of the recuperator 60, or may additionally and/or alternatively be used in the regulation, control, and/or activation of the engine 50 as a whole, i.e., an engine controller, and/or one or more other subsystems or aspects of aircraft 52.

Referring now to FIG. 4, the recuperator 60 may be electrically powered. To power or energize the recuperator 60, the aircraft 52 may include an electrical generator 72 configured to receive power from the engine 50. For example, the electrical generator 72 may be coupled to the turbine 58 via a rotational shaft, which translates power from the turbine 58 when it extracts work from the fluid flow stream and drives the shaft. Other devices capable of providing energy to the recuperator 60 are also within the scope of the present disclosure. The electrical generator 72 may be coupled with the engine 50 using a variety of shafts, gearings, transmissions, clutches, etc. In one non-limiting form the electrical generator 72 may be coupled to a spool shaft of the engine 50 using a bevel gear. While only one electrical generator 72 is shown, it should be appreciated that there may be any number of electrical generators 72.

Referring now to FIG. 5, the recuperator 60 may comprise a vane 74 arranged as portion of the compressor discharge 70. The vane 74 may include an aerodynamic shape such as an airfoil, and in some exemplary approaches may have an identical form, fit, and aerodynamic function as a vane that is not configured as a recuperator 60. The same form, fit, and function equivalence can be used when other components serve as the recuperator 60. The vane 74 may be a part of a vane assembly having an inner band 76 and an outer band 78, which serve as a first terminal and a second terminal, respectively, i.e., a power bus to deliver electricity to the vane 74. The vane 74 may be made from a variety of electrically conductive materials including, but not limited to, nickel chromium. A first conduit 80 may be in electrical communication with the inner band 76, and a second conduit 82 may be in electrical communication with the outer band 78. A seal 84 may be used to isolate the first conduit 80 and/or the second conduit 82 from the engine structure, which may be metallic as well as to prevent, among other potential possibilities, unintended electrical connection with one or more conductive components of the engine 50. The seal 84 may be, but is not limited to, a ceramic seal. The conduit 80, furthermore, may be routed through a strut 86 to a radially outer portion of the engine 50. It should be appreciated that the first conduit 80 may be routed to the radially outer portion in and/or through other locations. The conduits 80 and 82 may be in the form of electrical cabling, or may additionally and/or alternatively take other shapes and or be coupled with metallic components of the engine 50 as part of an electrical pathway.

The first conduit 80 and/or the second conduit 82 may be routed through a casing 88 of the engine 50 or of the compressor 54. In one non-limiting example, the conduit 82 may be routed through the casing 88 via an opening, which may further include the seal 84. The first conduit 80 also may be routed through a bolt 90 having a passage for such purposes. The bolt 90 may be a casing bolt in one nonlimiting example. The first conduit 80 and the second conduit 82 may be routed through the casing 88 using any variety of techniques.

Referring now to FIG. 6, aircraft 52 may further include an energy storage device 92 and a load 94. The energy storage device 92 may be any suitable device useful for storing energy, including, but not limited to, chemical, potential, and kinetic energy, or combinations thereof, for later use. In one form the energy storage device 92 may be one or more batteries. The load 94 may be any device that uses energy. For example, the load 94 may be a motor or a weapon, to set forth just two non-limiting examples.

The electrical generator 72 may be configured to selectively provide electrical power to the recuperator 60 as well as to the energy storage device 92 depending on requirements at any given time. Furthermore, the energy storage device 92 may be configured to selectively provide electrical power to the load 94 depending on requirements. Although the selective nature of the power provided to the various components is depicted as switches, it should be appreciated that any variety of implementation is within the scope of the present disclosure.

The engine 50 and one or more devices may be operated in a number of different modes, including, but not limited to, an intermediate speed power mode, a low power mode and a high power mode. The controller 64 may be configured to include one or more sets of instructions that enable the engine 50 and associated devices to selectively operate in any one of the modes by providing power to the recuperator 60 and/or the load 94. For example, in the low power mode, relatively little power is required and therefore produced. As such, little to no power is provided to either the recuperator 60 or the load 94, and fuel to the engine 50 may be decreased. The recuperator 60 may then be used to provide thermal energy back to the fluid flow stream of the engine 50, as described above, and little to no power may be provided to the load 94. The energy storage device 92 also may be charged to store energy during this heightened mode.

In the high power mode, fuel to the engine 50 may be increased, power may be diverted from the recuperator 60 toward the load 94, and the energy storage device 92 may be used to supplement power to the load 94. In this mode, little to no power may be provided to the recuperator 60. When the load 94 ceases its requirement for power, the engine 50 may be returned to the low power mode in which the electrical generator 72 may be used to recharge the energy storage device 92. In addition or alternatively, the electrical generator 72 may be used to power the recuperator 60, and/or a fuel flow to the engine 50 may be reduced to a similar state as that existed in the low power mode while maintaining the speed/power setting of the engine 50. This may allow the engine 50 to operate at an optimum operating point even when the load 94 is off. The engine 50 depicted in FIG. 6 and described above may be a single spool engine or a multi-spool engine.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosures are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   an engine having:
   a compressor and a turbine coupled together with a flow path there between by which a fluid flow stream is flowable from the compressor to the turbine, the compressor having a compressor discharge through which the fluid flow stream exits the compressor, the turbine being configured to generate power;
   a combustor located between the compressor and the turbine, the combustor being configured to provide heat to the fluid flow stream before entering the turbine;
   at least one recuperator disposed downstream of the compressor, the recuperator being configured to transfer heat with the fluid flow stream en route to the combustor;
   an electric generator operatively coupled to the turbine to receive at least a portion of the power generated by the turbine, the electric generator further being in communication with the at least one recuperator; and
   a controller configured to operate the engine in a low power mode, a high power mode, and at least one intermediate speed/power mode, the controller configured to selectively distribute energy from the electric generator between the at least one recuperator and a load, the controller configured to direct energy to the at least one recuperator while reducing a fuel flow to the engine when in the intermediate speed/power mode to maintain a speed/power setting of the engine;
   wherein the recuperator is configured in an off condition in the low power mode.

2. The system of claim 1 wherein the compressor discharge has a first terminal and a second terminal in communication with the at least one recuperator, the first terminal and the second terminal being configured to subject a potential difference to the recuperator to enable the heat transfer with the fluid flow stream.

3. The system of claim 2 wherein the first terminal and the second terminal are located at a radially inner end of the recuperator and a radially outer end of the recuperator, respectively.

4. The system of claim 3 wherein the at least one recuperator includes an electrical conduit routed from the radially inner end through the fluid flow stream.

5. The system of claim 1 wherein the recuperator is configured in an off condition in the low power mode and the high power mode.

6. The system of claim 1 further comprising an energy storage device configured to provide energy to the load when the engine transitions from the low power mode to the high power mode.

7. The system of claim 6 wherein the load is configured to receive power from at least one of the electric generator and the energy storage device.

8. The system of claim 7 wherein the controller is further configured to selectively supply power to the load from at least one of the electric generator and the energy storage device.

9. The system of claim 1 wherein the engine further comprises a low pressure spool to which the turbine is connected.

10. A method comprising:
supplying fuel at a flow rate to an engine such that the engine operates in a high power mode, the engine including a compressor, a combustor, a turbine, and a recuperator;
decreasing the fuel flow rate while supplying energy to the recuperator from the turbine such that the engine continues to maintain a speed/power setting during an intermediate speed/power mode; and
powering a load by:
reducing energy supplied to the recuperator; and
transmitting power from an energy storage device to the load.

11. The method of claim 10 further comprising further increasing the fuel flow rate after supplying energy to the recuperator.

12. The method of claim 11 further comprising accelerating the compressor of the engine prior to powering the load.

13. The method of claim 10 wherein the recuperator is electrically driven, and wherein energy is supplied to the recuperator via an electrical generator.

14. The system of claim 1, wherein the controller during the intermediate speed/power mode is configured to reduce the fuel flow to a flow rate approximately equal to a fuel flow rate at the low power mode.

15. The system of claim 10, wherein the fuel flow rate is decreased during the intermediate speedpower mode to be approximately equal to a fuel flow rate at a low power mode.

16. The system of claim 1, wherein the controller is in communication with at least one sensor, the sensor configured to measure or calculate sensor data comprising one or more of static temperature, static pressure, total temperature, total pressure, equivalent airspeed, altitude, and Mach number;
wherein the controller is configured to distribute energy to the at least one recuperator based on the sensor data.

* * * * *